United States Patent
Suzuki

(10) Patent No.: US 9,710,109 B2
(45) Date of Patent: Jul. 18, 2017

(54) IMAGE PROCESSING DEVICE AND IMAGE PROCESSING METHOD

(71) Applicant: FUJITSU LIMITED, Kawasaki-shi, Kanagawa (JP)

(72) Inventor: Genta Suzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 152 days.

(21) Appl. No.: 14/695,746

(22) Filed: Apr. 24, 2015

(65) Prior Publication Data

US 2015/0317037 A1 Nov. 5, 2015

(30) Foreign Application Priority Data

May 1, 2014 (JP) .................................. 2014-094404

(51) Int. Cl.
*G06F 3/041* (2006.01)
*G06F 3/042* (2006.01)

(52) U.S. Cl.
CPC .......... *G06F 3/0425* (2013.01); *G06F 3/0426* (2013.01)

(58) Field of Classification Search
CPC .......... H04N 5/225; G02F 1/13; G03B 21/00; G09F 9/00; G06F 3/02; G06F 3/045; G06F 3/041; G09G 5/00
See application file for complete search history.

(56) References Cited

U.S. PATENT DOCUMENTS

| 8,373,654 | B2 * | 2/2013 | Wang | ...................... G06F 3/017 345/156 |
| 9,411,432 | B2 * | 8/2016 | Tang | ...................... G06F 3/0317 |
| 2001/0028341 | A1 * | 10/2001 | Kitazawa | .............. G06F 3/0425 345/156 |
| 2007/0097017 | A1 * | 5/2007 | Widdowson | ........... G09G 3/002 345/1.3 |
| 2009/0103780 | A1 * | 4/2009 | Nishihara | ............... G06F 3/017 382/103 |

(Continued)

FOREIGN PATENT DOCUMENTS

| JP | 3-56402 | 3/1991 |
| JP | 2001-211372 | 8/2001 |

(Continued)

OTHER PUBLICATIONS

"Development of Next Generation User Interface Intuitively Operable with Finger", Fujitsu Laboratories Ltd., Apr. 3, 2013, 9 pages.

(Continued)

*Primary Examiner* — Pegeman Karimi
(74) *Attorney, Agent, or Firm* — Staas & Halsey LLP

(57) ABSTRACT

An image processing device includes a processor; and a memory which stores a plurality of instructions, which when executed by the processor, cause the processor to execute: obtaining an actual image including a motion part and a target object of an operation; recognizing the motion part from the actual image; defining an operation area of the actual image based on a position of the motion part; computing a first image feature of the operation area; and generating a display image by setting, based on the first image feature, the operation area and/or the motion part to be a second image feature which differs from the first image feature.

21 Claims, 11 Drawing Sheets

(56) References Cited

U.S. PATENT DOCUMENTS

| | | | | |
|---|---|---|---|---|
| 2010/0165414 | A1* | 7/2010 | Kautto | B42D 25/29 |
| | | | | 358/3.28 |
| 2011/0141030 | A1* | 6/2011 | Chen | G06F 3/0416 |
| | | | | 345/173 |
| 2012/0320092 | A1* | 12/2012 | Shin | G06F 3/0425 |
| | | | | 345/633 |

FOREIGN PATENT DOCUMENTS

| | | |
|---|---|---|
| JP | 2003-346162 | 12/2003 |
| JP | 2006-189712 | 7/2006 |

OTHER PUBLICATIONS

Dalal N. et al., "Histograms of Oriented Gradients for Human Detection", IEEE Computer Society Conference on Computer Vision and Pattern Recognition (CVPR), 2005, 8 pages.

Kato H. et al., "Marker Tracking and HMD Calibration for a Video-based Augmented Reality Conferencing System", In Proceedings of the 2nd IEEE and ACM International Workshop on Augmented Reality (IWAR 99), Oct. 1999, 10 pages.

Audet S. et al., "A User-Friendly Method to Geometrically Calibrate Projector-Camera Systems", Computer Vision and Pattern Recognition Workshops, 2009. CVPR Workshops 2009. IEEE Computer Society Conference on, IEEE, 2009, pp. 47-54.

Kimme C. et al., "Finding Circles by an Array of Accumulators", Communications of the Association for Computing Machinery, Short Communications Graphics and Image Processing, vol. 18, No. 2, Feb. 1975, pp. 120-122.

* cited by examiner

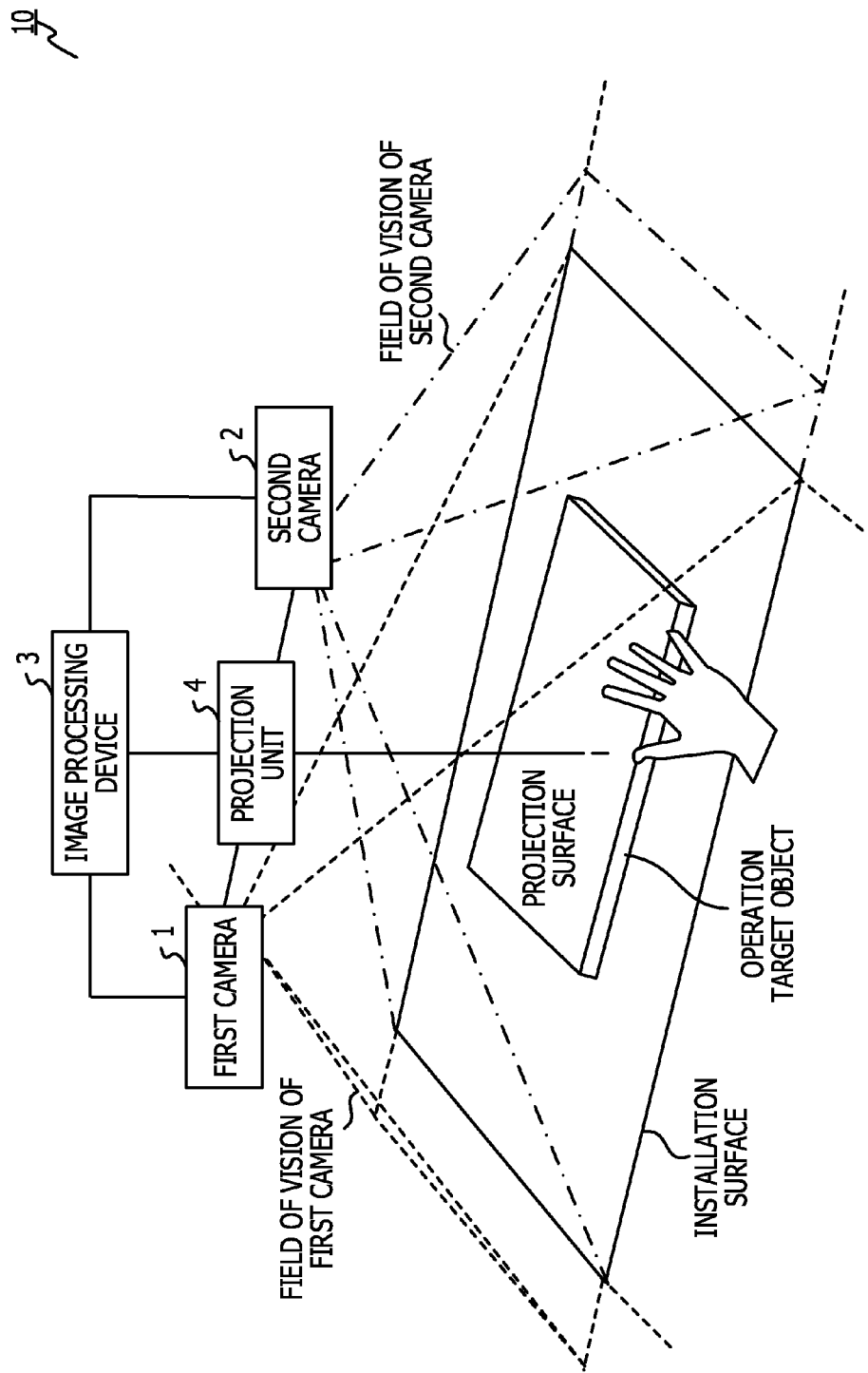

FIG. 5

| FRAME No | IMAGE ID | HAND ID | FINGER ID | COORDINATES OF HAND CONTOUR AREA (pixel) | COORDINATES OF FINGER (pixel) |
|---|---|---|---|---|---|
| 1 | 1 (FIRST IMAGE) | 1 | 1 | (0,118), (1,120), ... | (180,260) |
| | | | 2 | NULL | NULL |
| | | | 3 | NULL | NULL |
| | | | 4 | NULL | NULL |
| | | | 5 | NULL | NULL |
| | | 2 | 1 | NULL | NULL |
| | | | 2 | NULL | NULL |
| | | | 3 | NULL | NULL |
| | | | 4 | NULL | NULL |
| | | | 5 | NULL | NULL |
| | 2 (SECOND IMAGE) | 1 | 1 | (0,118), (1,120), ... | (220,260) |
| | | | 2 | NULL | NULL |
| | | | 3 | NULL | NULL |
| | | | 4 | NULL | NULL |
| | | | 5 | NULL | NULL |
| | | 2 | 1 | NULL | NULL |
| | | | 2 | NULL | NULL |
| | | | 3 | NULL | NULL |
| | | | 4 | NULL | NULL |
| | | | 5 | NULL | NULL |
| ... | ... | ... | ... | ... | ... |

| FRAME NO | HAND ID | FINGER | CAMERA COORDINATES (pixel) | DEPTH OF FINGER (mm) |
|---|---|---|---|---|
| 1 | 1 | 1 | (200,260) | 283 |
| | | 2 | NULL | NULL |
| | | 3 | NULL | NULL |
| | | 4 | NULL | NULL |
| | | 5 | NULL | NULL |
| | 2 | 1 | NULL | NULL |
| | | 2 | NULL | NULL |
| | | 3 | NULL | NULL |
| | | 4 | NULL | NULL |
| | | 5 | NULL | NULL |
| ... | ... | ... | ... | ... |

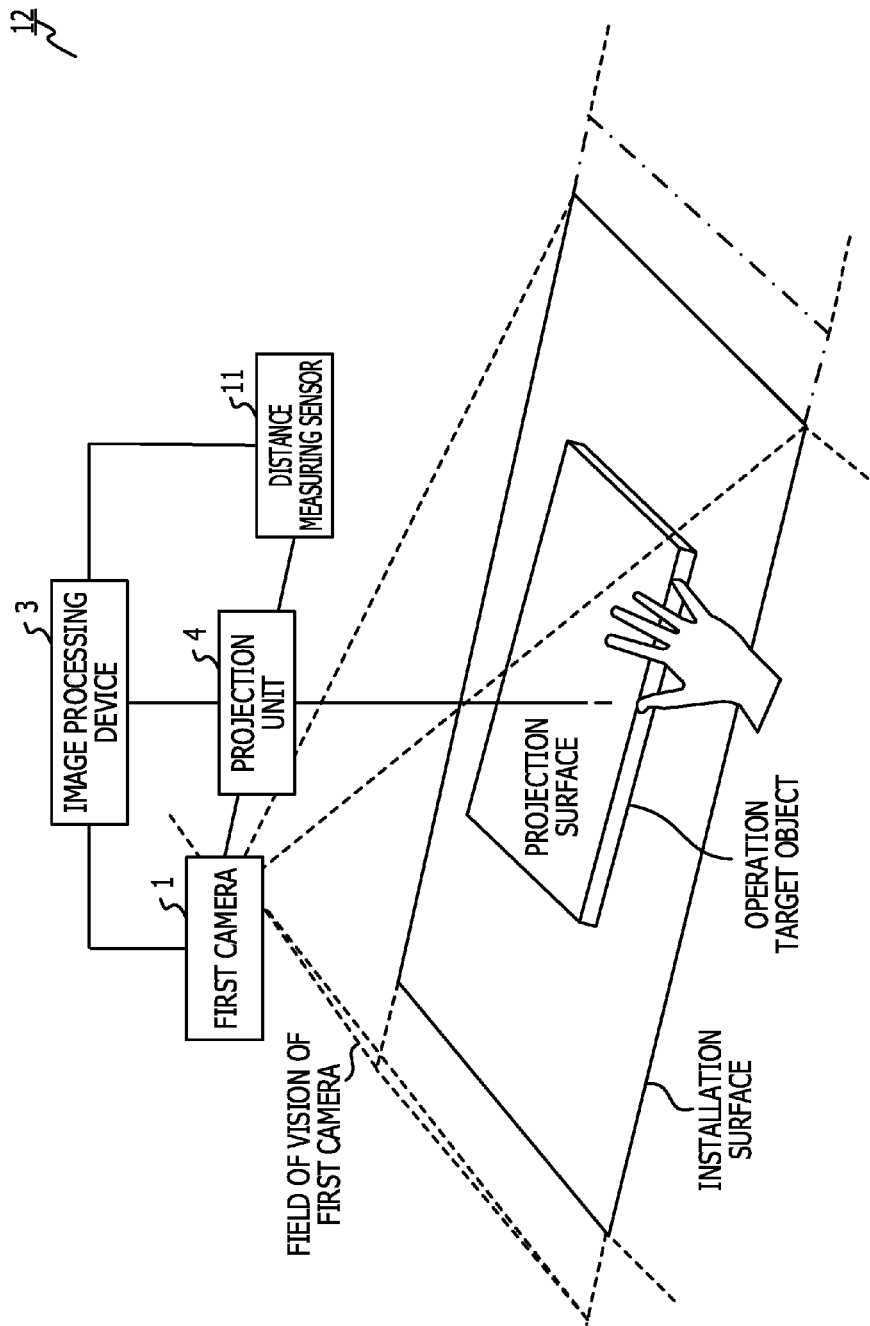

IMAGE PROCESSING DEVICE AND IMAGE PROCESSING METHOD

CROSS-REFERENCE TO RELATED APPLICATION

This application is based upon and claims the benefit of priority of the prior Japanese Patent Application No. 2014-094404, filed on May 1, 2014, the entire contents of which are incorporated herein by reference.

FIELD

The embodiments discussed herein are related to an image processing device, an image processing method, and an image processing program that, for example, generate a display image to be used to support operation by a user.

BACKGROUND

There has been proposed a projection-based augmented reality (AR) technology in recent years. The projection-based augmented reality technology obtains an image by capturing the image of an arbitrary operation target object within a field of vision of a user with a camera fixed at an arbitrary place or a movable camera and then displays a display image including additional information (for example, the content of operation) related to the operation target object with a projector directly on the operation target object in a superimposed manner. The method of presenting information using the projection-based augmented reality technology has advantages such as an improvement in operational efficiency when compared with an augmented reality technology in the related art that displays additional information on a display such as a display of a portable terminal, because comparing both of an operation target object on a display and an actual operation target object is not desired in the above method. An image processing device using the projection-based augmented reality technology has been proposed. The image processing device detects, for example, a motion of fingers of a user with respect to an operation target object on a table and projects a display image corresponding to the motion with a projector.

SUMMARY

In accordance with an aspect of the embodiments, an image processing device includes a processor; and a memory which stores a plurality of instructions, which when executed by the processor, cause the processor to execute: obtaining an actual image including a motion part and a target object of an operation; recognizing the motion part from the actual image; defining an operation area of the actual image based on a position of the motion part; computing a first image feature of the operation area; and generating a display image by setting, based on the first image feature, the operation area and/or the motion part to be a second image feature which differs from the first image feature.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIG. 1 is a schematic diagram of an image processing system including an image processing device according to a first embodiment;

FIG. 5 is a table illustrating an example of a data structure including coordinates of a fingertip recognized by a recognition unit in a camera coordinate system;

FIG. 10 is a schematic diagram of an image processing system including the image processing device according to a second embodiment.

DESCRIPTION OF EMBODIMENTS

Figure 2A:
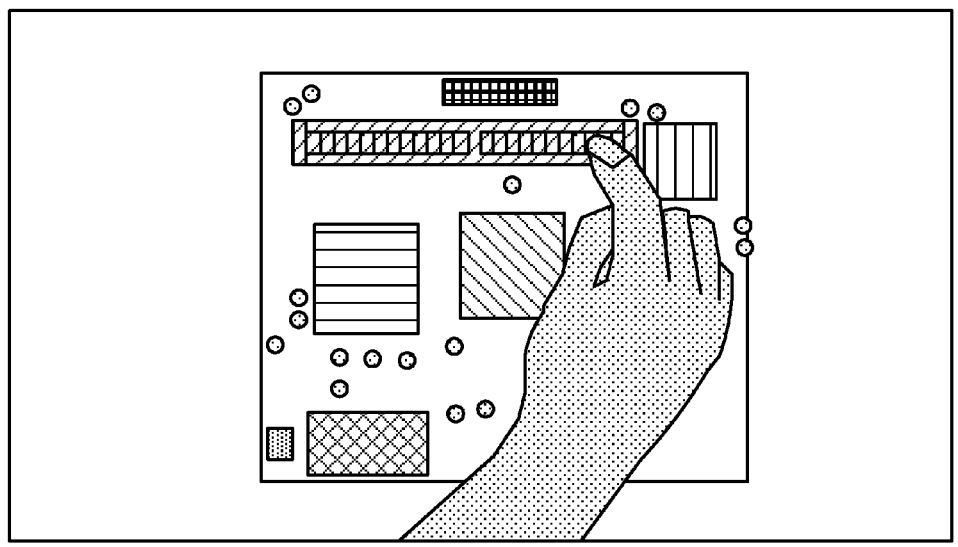
FIG. 2A is an example of a display image.

First, a description will be provided for problems in the related art. The problems are newly found as a result of a detailed review of technologies in the related art by the inventors and thus are not known in the related art.

It is assumed in a projection-based augmented reality technology that an unskilled user may easily perform the same content of operation as that by a skilled user by, for example, recording the content of operation performed by the skilled user on an electronic substrate which is an example of an operation target object and displaying (or projecting) frames of the recorded video on the electronic substrate as a display image in a superimposed manner. However, it is apparent that the visibility of a display image is degraded when the display image is displayed on an operation target object in a superimposed manner. Specifically, when a display image is projected onto an operation target object, projecting the display image onto the entire surface of the operation target object in a superimposed manner brightens the entire operation target object and causes luminance differences to disappear in an area around the operation target object. Thus, a user may apparently have difficulty in understanding which point (or an operation area) to focus on.

Furthermore, when the operation target object has a complicated hue distribution (or a color pattern distribution), projecting a display image causes the hue of the operation target object to be mottled in the relationship with the hue of the projection light of the display image. Thus, the visibility of the display image is apparently degraded. The inventors consider the cause of the problems as follows. The reflectivity of projection light of a display image becomes different, depending on combinations of the hue of a display image to project and the hue of an operation target object of a projection target. Accordingly, a hue is brightened at a part where reflectivity is high with respect to the hue (flesh color) of fingers and is darkened at a part with low reflectivity when a display image including fingers is projected onto the operation target object having a complicated hue distribution. This phenomenon occurs in any hue other than flesh color (in such a case where a user wears gloves) in the same manner. Thus, projecting a display image onto an operation target object causes the hue of the operation target object to be mottled when the operation target object has a complicated hue distribution.

Furthermore, it is difficult to match the position of an operation target object and the position of a display image completely because the operation target object in the display image is two-dimensional while the operation target object onto which the display image is projected is three-dimensional, each of which has a different dimensional quantity. Accordingly, the hue of the operation target object of a projection target does not match the hue of the display image as the shape of the operation target object is more complicated (in other words, as the number of edges thereof is greater). Thus, the visibility of the display image is apparently degraded.

In light of the newly found problems, the inventors newly find that a display image may be created at a low cost by recording the content of operation performed by a skilled user and using frames of the recorded video as a display image, since a creator of a display image is not desired to perform any specific operation to create a display image. The inventors further find newly that there may be provided an image processing device that generates a display image which may have improved visibility for a user at a low cost, provided that the visibility of such a display image above may be improved.

Hereinafter, descriptions will be provided for an image processing device, an image processing method, and an image processing program according to an embodiment with reference to the drawings while taking into consideration the new technical matters found from the verification assiduously performed by the inventors above. The embodiment is not intended to limit the disclosed technology.

System Configuration

FIG. 1 is a schematic diagram of an image processing system 10 including an image processing device 3 according to a first embodiment. The image processing system 10 includes a first camera 1, a second camera 2, an image processing device 3, and a projection unit 4. The image processing device 3 is communicably connected to the first camera 1, the second camera 2, and the projection unit 4 in a wired or wireless manner. The image processing device 3 includes an unillustrated communication unit and may use resources on a network by transmitting and receiving data to and from various external devices bidirectionally through a communication line. The projection unit 4 may be included in the image processing system 10 when desired but may not be provided in the image processing system 10 (may be a separate body from the image processing system 10). The first camera 1, the second camera 2, the image processing device 3, and the projection unit 4, for example, may be desirably arranged to face an installation surface but may be arranged to face a wall surface or arranged at an arbitrary position on a mobile terminal or a wearable terminal.

The projection unit 4 is a display device such as a projector. The projection unit 4, for example, displays a display image including additional information on an operation target object (for example, the content of operation performed by a skilled user). The projection unit 4, for example, projects a display image in a superimposed manner onto an operation target object which is an example of a projection surface that a user sees directly.

The first camera 1 and the second camera 2, for example, are imaging devices such as a charge-coupled device (CCD) camera and a complementary metal oxide semiconductor (CMOS) camera. Each of the first camera 1 and the second camera 2, for example, has a field of vision such as that illustrated in FIG. 1. The first camera 1 and the second camera 2 image an actual image including an operation target object (for example, an electronic substrate) and fingers which are an example of a part of a user in motion. In the first embodiment, an operation target object further includes a marker (for example, a two-dimensional code) for specifying a unique operation target object for convenience of description.

The image processing device 3, for example, is a hardware circuit configured by a wired logic. The image processing device 3 may be a functional module realized by a computer program. The image processing device 3 may be an integrated circuit such as an application-specific integrated circuit (ASIC) or a field programmable gate array (FPGA). The position where the image processing device 3 is arranged in the image processing system 10 may be set freely, but, for example, the image processing device 3 may be desirably arranged in the vicinity of the projection unit 4. The image processing device 3 obtains a first image captured by the first camera 1 and a second image captured by the second camera 2 and computes the position of a part of a user in motion (for example, fingers) in, for example, a world coordinate (or a three-dimensional orthogonal coordinate) system. In other words, the image processing device 3 may obtain the first image and the second image, all of which are captured on different optical axes. In addition, the image processing device 3 may control a projection process performed by the projection unit 4 when desired. A detailed description will be provided later for the function of the image processing device 3.

The projection unit 4, for example, may be arranged horizontally to the installation surface or the ground, define the projection surface, and project a display image onto an operation target object as illustrated in FIG. 1. The projection unit 4, the first camera 1, and the second camera 2, for example, are installed above the projection surface in a vertically downward direction. The first camera 1 and the second camera 2 have equal intrinsic parameters which are previously known, have optical axes that are parallel to each other, and are arranged so that arbitrary horizontal axes in a plurality of images captured by the first camera 1 and the second camera 2 are on the same straight line, that is, have a so-called parallel stereoscopic arrangement. The first camera 1 and the second camera 2 image the first image, the second image, and an image including pieces of information such as the depth of an operation target object and the depth of fingers (or fingertips) which are an example of a part of a user in motion. The first camera 1 and the second camera 2 may be arranged to operate while maintaining the parallel stereoscopic arrangement. Since the projection unit 4 projects a display image onto an operation target object, a user may perform operation desired for the operation target object while referring to the projected display image.

Positional alignment (calibration) in a camera coordinate system of the first camera 1 and the second camera 2 and a world coordinate (three-dimensional orthogonal coordinate) system of the projection unit 4 is performed in advance at the point in time of the configuration of the image processing system 10 illustrated in FIG. 1. Calibration may be desirably performed at least once when the positional relationship between the first camera 1, the second camera 2, and the projection unit 4 is changed after the start of the use of the image processing device 3. A description will be provided here for a method, as a specific example of a calibration method, which performs calibration inside the image processing device 3 by imaging an arbitrary projection image projected by the projection unit 4 with the first camera 1 and the second camera 2. In the method, each of the first camera 1 and the second camera 2 is calibrated in advance.

First, the projection unit 4 projects an arbitrary marker onto arbitrary coordinates $(x_p, y_p)$ in the world coordinate system. The marker may have an arbitrary color or an arbitrary shape in order to be easily distinguished from the surrounding background. The first camera 1 and the second camera 2 images the marker projected onto a predetermined projection surface. Next, the image processing device 3 recognizes the marker through known arbitrary image processing. For example, the image processing device 3 may recognize a circular shape through the Hough circle transform disclosed in "Kimme et al., *Finding circles by an array of accumulators*", Communications of the Association for Computing Machinery, #18, pp. 120-122, 1975." when the projection unit 4 projects a circular shape as a marker. The coordinates of the marker recognized by the image processing device 3 are set to $(x_i, y_i)$. The image processing device 3 repeats the above process for four points at an arbitrary place. The image processing device 3 computes each component of a three-by-three homography matrix H from four sets of $(x_i, y_i)$ that are obtained in the process and correspond to $(x_p, y_p)$ by using eight-dimensional simultaneous linear equations. A homography is a matrix representing a projective transformation of a plane into another plane in a three-dimensional space. The image processing device 3 obtains mapping between the camera coordinate plane of the first camera 1 and the second camera 2 and a projection unit coordinate plane of the projection unit 4. The image processing device 3 may use the homography matrix at the time of projection of a display image by holding the computed and obtained homography matrix in, for example, an unillustrated cache or a memory.

Figure 2B:
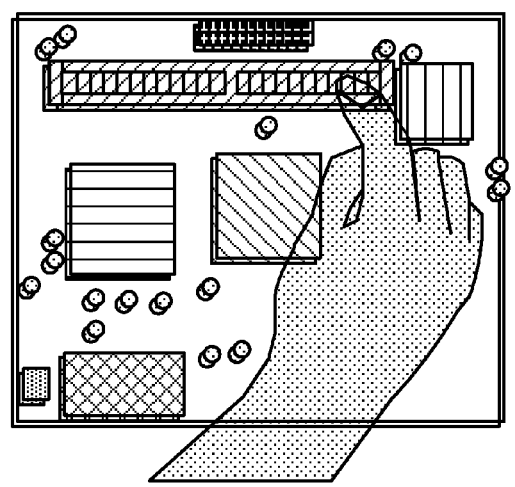
FIG. 2B is a superimposed image of the display image projected onto an operation target object.

FIG. 2A is an example of a display image. FIG. 2B is a superimposed image of the display image projected onto an operation target object. A display image, for example, includes fingers, which are an example of a part of a user in motion, and an electronic substrate, which is an example of an operation target object, as illustrated in FIG. 2A. The operation target object in the display image is two-dimensional while the actual operation target object onto which the display image is projected is three-dimensional as illustrated in FIG. 2B, each of which has a different dimensional quantity. Thus, the position of the operation target object does not completely match the position of the display image. For this reason, as described above, the hue of the operation target object may not match the hue of the projected display image as the shape of the operation target object is more complicated (in other words, as the number of edges thereof is greater). Thus, the visibility of the display image may be degraded. In addition, when the display image is projected onto the operation target object in a superimposed manner as illustrated in FIG. 2B, the entire operation target object is brightened, and luminance differences disappear in an area around the operation target object as described above. Thus, a user may have difficulty in understanding which point (or an operation area) to focus on.

First Embodiment

The first embodiment will be disclosed regarding, for example, an embodiment of generating a display image to project onto an operation target object. Thus, the projection unit 4 in the image processing system 10 in FIG. 1 may not be provided in the first embodiment.

Figure 3:
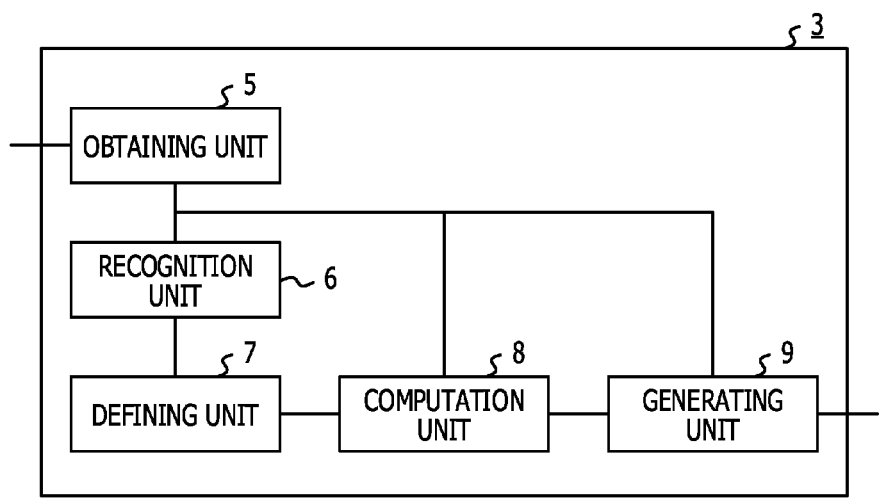
FIG. 3 is a functional block diagram of the image processing device according to an embodiment.
Figure 4:
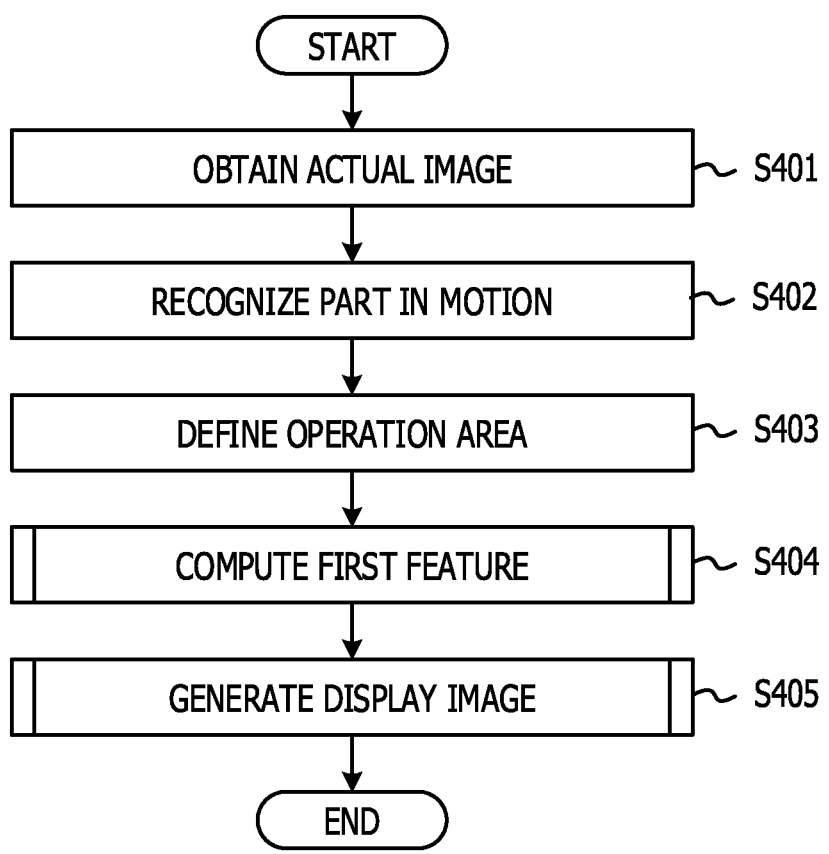
FIG. 4 is a flowchart of image processing by the image processing device.

FIG. 3 is a functional block diagram of the image processing device 3 according to an embodiment. The image processing device 3 includes an obtaining unit 5, a recognition unit 6, a defining unit 7, a computation unit 8, and a generating unit 9. The image processing device 3 includes an unillustrated communication unit and may use resources on a network by transmitting and receiving data to and from various external devices bidirectionally through a communication line. FIG. 4 is a flowchart of image processing by the image processing device 3. In the first embodiment, the flow of image processing by the image processing device 3 illustrated in FIG. 4 will be described in association with a description of each function in the functional block diagram of the image processing device 3 illustrated in FIG. 3.

The obtaining unit 5, for example, is a hardware circuit configured by a wired logic. The obtaining unit 5 may be a functional module realized by a computer program executed in the image processing device 3. The obtaining unit 5, for example, receives a plurality of actual images (or the first image and the second image) captured on different optical axes by an external device. This process corresponds to step S401 in the flowchart illustrated in FIG. 4. The actual image, for example, includes fingers which are an example of a part of a user in motion. The actual image further includes an operation target object which is a target of operation. The resolution or the frequency of obtainment of the actual image received by the obtaining unit 5 may be defined at an arbitrary value, depending on the speed or the accuracy of the process desired in the image processing device 3. For example, the obtaining unit 5 may obtain an image of VGA (640×480) resolution at a frequency of obtainment of 30 FPS (30 frames per second). The external device imaging an image is, for example, the first camera 1 and the second camera 2. The first camera 1 images the first image, and the second camera 2 images the second camera. The first camera 1 and the second camera 2, for example, image an image including fingers of a user as a part of a user in motion. The first camera 1 and the second camera 2 may be included in the image processing device 3 when desired. The obtaining unit 5 outputs the obtained actual image to the recognition unit 6, the computation unit 8, and the generating unit 9.

The recognition unit 6, for example, is a hardware circuit configured by a wired logic. The recognition unit 6 may be a functional module realized by a computer program executed in the image processing device 3. A first feature model (or a discriminator) may be stored in advance through preliminary learning on an unillustrated cache or a memory held by the recognition unit 6. The first feature model has features of a part in motion that are extracted in advance. The first feature model may be generated in accordance with luminance gradient features such as a histogram of oriented gradients (HOG) features or a local binary pattern (LBP) features. The preliminary learning, for example, is performed by using an image (positive image) in which a target object (fingers as an example of a part in motion) is captured and an image (negative image) in which a target object is not captured. The preliminary learning may use learning techniques of various known discriminators such as Adaboost and a support vector machine (SVM). For example, the learning techniques of a discriminator using an SVM disclosed in "N. Dalal et al., *Histograms of Oriented Gradients for Human Detection*, 2005 *IEEE Computer Society Conference on Computer Vision and Pattern Recognition (CVPR)*, 2005." may be used as learning techniques of the discriminator.

The recognition unit 6 receives a plurality of actual images (or the first image and the second image) from the obtaining unit 5 and extracts color features or luminance gradient features from the actual images. The recognition unit 6, for example, may extract pixel values in an RGB color space as the color features. The recognition unit 6, for example, may extract HOG features or LBP features as the luminance gradient features. The luminance gradient features, for example, may desirably be calculable features in a certain rectangular area. The recognition unit 6, for example, may extract HOG features as an example of the luminance gradient features by using a method disclosed in "N. Dalal et al., *Histograms of Oriented Gradients for Human Detection*, 2005 *IEEE Computer Society Conference on Computer Vision and Pattern Recognition (CVPR)*, 2005". For convenience of description, the recognition unit 6 is described as extracting color features in the first embodiment.

The recognition unit 6 recognizes, based on the color features, the position of fingers of a user, which are an example of a part in motion, in the camera coordinate system. This process corresponds to step S402 in the flowchart illustrated in FIG. 4. The recognition unit 6 may refer to the first feature model stored on an unillustrated cache or a memory of the recognition unit 6, depending on the necessity thereof when recognizing a part in motion based on the luminance gradient features. A description will be provided here for a method of recognizing a part in motion by using the color features in the recognition unit 6. The recognition unit 6 extracts a flesh-colored area by using the extracted color features and recognizes a hand contour area (a contour area including fingers and the back of a hand) based on the flesh-colored area by using various known techniques. The recognition unit 6 may appropriately adjust thresholds in an RGB space or an HSV space during the extraction of the flesh color components. The recognition unit 6, for example, may detect the hand contour area by using a method disclosed in Japanese Patent No. 3863809. The recognition unit 6 may also recognize the hand contour area by using a method of holding learning data related to the shape of a hand in advance and computing the shape of fingers by calculating the similarity between the learning data and current image data. The recognition unit 6 computes the position of fingers (or fingertip coordinates) of a user in the camera coordinate system, the fingers being included in each of the plurality of actual images (the first image and the second image). The recognition unit 6, for example, may compute the fingertip coordinates from the contours in the hand contour area after recognizing the number of fingers from the detected hand contour area.

FIG. 5 is a table illustrating an example of a data structure including coordinates of a fingertip recognized by the recognition unit 6 in the camera coordinate system. The camera coordinate system in a table 50 in FIG. 5 is defined to have an origin at the upper left end of the first image or the second image, have the right direction in the first image or the second image as the positive direction of an x axis, and have the downward direction in the first image or the second image as the positive direction of a y axis. Fingertip coordinates of each finger computed from the first image and the second image in a case where a user stretches an index finger are associated with the hand ID and the finger ID and are stored in the table 50 for each frame No. The finger ID, for example, may be given in order of smallest coordinate in the horizontal direction. A reference point for each of the coordinates of fingers may be defined as, for example, the upper left end of the first image or the second image. The recognition unit 6 may store coordinates of the hand contour area defined based on the flesh-colored area described above in the table 50. The recognition unit 6 may desirably store data sequentially in the cells of the hand ID 1 when recognizing only one hand. In addition, the recognition unit 6 may desirably store data sequentially in the cells of the hand ID 2 in addition to the hand ID 1 when recognizing two hands. The table 50, for example, may desirably be stored on an unillustrated cache or a memory of the recognition unit 6.

Next, the recognition unit 6 computes the depth of fingers (fingertips) of a user in the world coordinate system by using a binocular stereoscopic method. The recognition unit 6 may compute the depth with the following equation by using the principle of triangulation given that the depth of an arbitrary reference point (For example, a reference point may desirably be the center point between the first camera 1 and the second camera 2. In other words, a reference point is the center point between a first optical center in the first image and a second optical center in the second image.) in the depth direction in the world coordinate system is Z, the length of a line (length of the base) between the first camera 1 and the second camera 2 is b (in other words, the length of the base between the first optical center of the first image and the second optical center of the second image), the focal length of the first camera 1 and the second camera 2 is f, and the positions of fingertips in the first image and the second image in the camera coordinate system are respectively (u, v) and (u', v').

$$Z = b^* f / |U - u'| \qquad \text{Equation 1}$$

Figure 6:
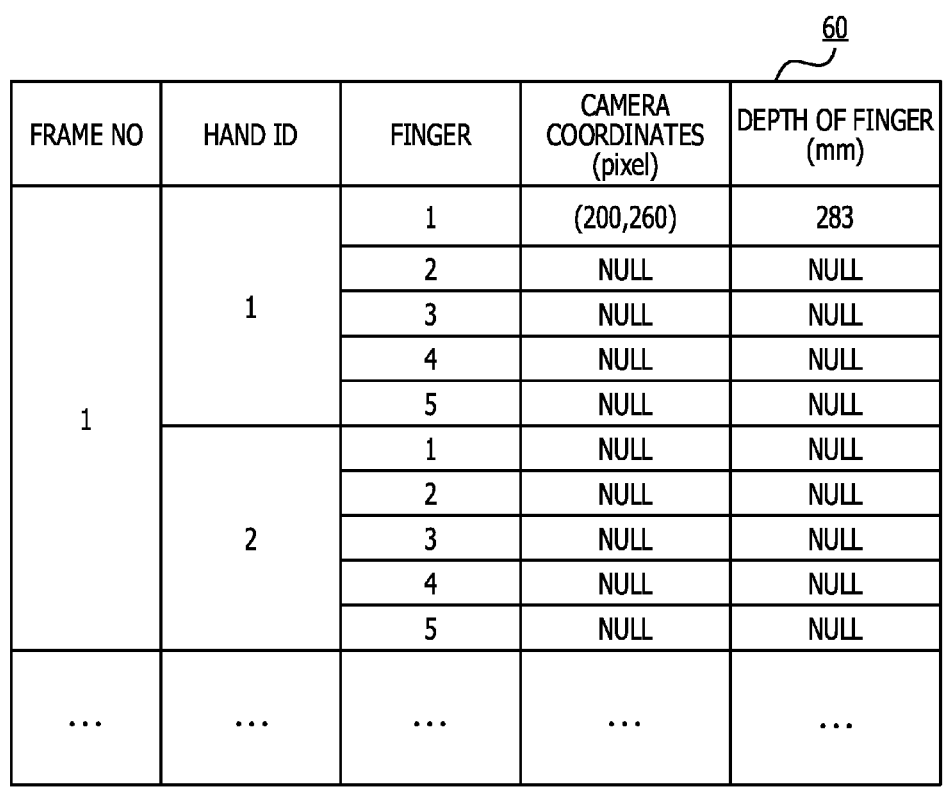
FIG. 6 is a table illustrating an example of a data structure for a position of fingers computed by the recognition unit in the camera coordinate system and a world coordinate system.

|u−u'| in above Equation 1 corresponds to a disparity d representing a displacement of the position of a pixel at which the same target object (for example, fingers of a user as an example of a part in motion) is imaged. The recognition unit 6 may use values (coordinates of fingers) stored in the table 50 in FIG. 5 as the value of u and u' in above Equation 1. For example, when a user stretches only an index finger, data is stored only in the finger ID 1 in the table 50 in FIG. 5. Thus, the recognition unit 6 may desirably use values stored in the finger ID 1. FIG. 6 is a table illustrating an example of a data structure for a position of fingers computed by the recognition unit 6 in the camera coordinate system and the world coordinate system. Data including the position of coordinates of fingers in the camera coordinate system and the depth of fingers in the world coordinate system is stored in a table 60 in FIG. 6 with, for example, an index finger set as the finger ID 1 of the hand ID 1.

An unillustrated cache or a memory of the recognition unit 6, for example, may store three-dimensional shape information of an operation target object. When the operation target object is one sheet of thin paper document, the paper document may be regarded as a two-dimensional shape being present on a flat surface of the preset projection surface without having a thickness. When the operation target object is an object having various thicknesses such as an electronic substrate, the recognition unit 6, for example, may obtain the three-dimensional shape of the operation target object in advance at the time of the start of image processing by the image processing device 3. The recognition unit 6, for example, may obtain the three-dimensional shape of an operation target object by using a method called an active stereoscopic method. There are various types of active stereoscopic methods, and any of these types may be applied to the recognition unit 6. For example, the recognition unit 6 may use a spatial coding method disclosed in Japanese Examined Patent Application Publication No. 03-56402. However, a method for realizing the active stereoscopic method is not limited to the spatial coding method.

Figure 7:
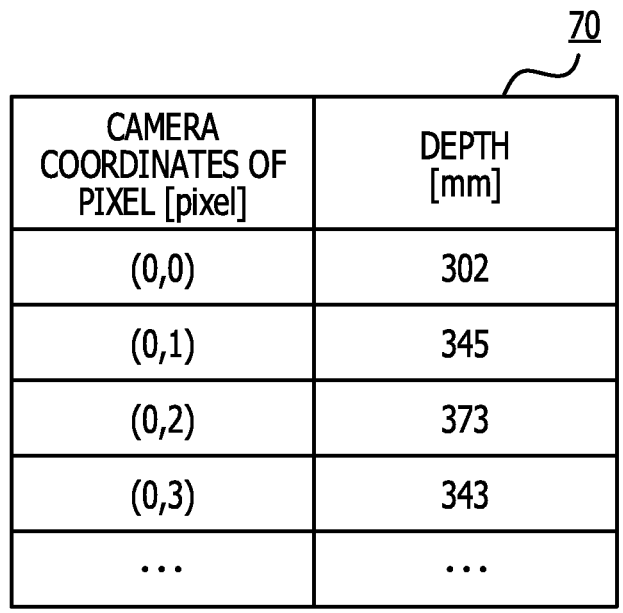
FIG. 7 is a table illustrating an example of a data structure for three-dimensional orthogonal coordinates of an operation target object recognized by the recognition unit.

The recognition unit 6, for example, computes a change in the pixels in a projection pattern through the spatial coding method by using, as an ID, the coordinates of every pixel in a certain pattern that is projected multiple times by the projection unit 4 and is made of patterned light and shade. By using the result, the recognition unit 6 may compute the depth (in units of mm) of each pixel in a certain pattern projected by the projection unit 4 through triangulation. By using the depth and the coordinates of each pixel with respect to an arbitrary reference point in the camera coordinate system, the recognition unit 6 may define three-dimensional orthogonal coordinates which represent the three-dimensional shape of an operation target object. The reference point for the coordinates of each pixel, for example, may be defined as the upper left end of an actual image (the first image or the second image) obtained by the obtaining unit 5. The reference point for the depth in the three-dimensional orthogonal coordinate system, for example, may be a middle point between the installation points of the first camera 1 and the second camera 2. FIG. 7 is a table illustrating an example of a data structure for three-dimensional orthogonal coordinates of an operation target object recognized by the recognition unit 6. The camera coordinates and the depth of each pixel with respect to an arbitrary reference point are stored as three-dimensional orthogonal coordinates of an operation target object as illustrated in a table 70 in FIG. 7. The defining unit 7 in FIG. 1, as will be described later, may determine whether fingers of a user are in contact with an operation target object by comparing the depth of an operation target object stored in the table 70 in FIG. 7 with the depth of fingertips stored in the table 60 in FIG. 6. The recognition unit 6 outputs the position of fingers, which are an example of a part in motion, to the defining unit 7. The recognition unit 6 also outputs the three-dimensional orthogonal coordinates of an operation target object to the defining unit 7 when desired.

The defining unit 7 in FIG. 3, for example, is a hardware circuit configured by a wired logic. The defining unit 7 may be a functional module realized by a computer program executed in the image processing device 3. The defining unit 7 receives the position (for example, each piece of data stored in the table 70 in FIG. 7) of fingers, which are an example of a part in motion, from the recognition unit 6. The defining unit 7 also receives the three-dimensional orthogonal coordinates (for example, each piece of data stored in the table 70 in FIG. 7) of an operation target object from the recognition unit 6 when desired. The defining unit 7 defines, based on the position of a part in motion, an operation area of an operation target object included in an actual image. This process corresponds to step S403 in the flowchart illustrated in FIG. 4. In other words, the defining unit 7 defines a certain area (N×M pixels where N and M may desirably be 50) from fingertips as the base point to be an operation area. Specifically, the defining unit 7, for example, may desirably define an operation area as an area of coordinates (200±50, 260±50) based on the camera coordinates of the finger ID 1 in the table 60 in FIG. 6. The defining unit 7 may define an operation area for each hand ID or finger ID or may define an operation area for a finger ID with the greatest depth when the hand ID or the finger ID is detected multiple times.

The defining unit 7 may define an operation area for an actual image by setting an area except fingers (may include an arm) and an operation area in an actual image to be transparent or black. When the defining unit 7 defines an operation area, and, for example, the projection unit 4 projects a display image, only the operation area has a luminance value greater than the surrounding area in the display image (in other words, only the operation area is brightened). This achieves the advantage that a user easily focuses on the projected information because of a difference in the luminance value, that is, the advantage of improving the visibility of the display image. In addition, the operation area may be defined automatically based on the position of a part in motion. Thus, the display image may be generated at a low cost.

The defining unit 7 in FIG. 3 may further define an operation area based on the three-dimensional orthogonal coordinates of an operation target object. Specifically, when the depth of fingers, which are a part of a user in motion, corresponds to the position of the three-dimensional orthogonal coordinates of an operation target object, the fingers of a user may be regarded as being in contact with the operation target object. Thus, an operation area may be defined only when fingers of a user are actually in contact with an operation target object, that is, when operation is actually performed for an operation target object.

The computation unit 8 in FIG. 3, for example, is a hardware circuit configured by a wired logic. The computation unit 8 may be a functional module realized by a computer program executed in the image processing device 3. The computation unit 8 receives an actual image from the obtaining unit 5 and receives an operation area from the defining unit 7. The computation unit 8 computes a first image feature of an operation area in an actual image. This process corresponds to step S404 in the flowchart illustrated in FIG. 4. The first image feature, for example, is one of the gradient (or the number of edges) of a pixel value in an operation area, the hue distribution of an operation area, and a pixel value in an operation area or is a combination of these values. The computation unit 8 outputs the computed first image feature to the generating unit 9. A detailed description will be provided later for image processing by the computation unit 8.

The generating unit 9, for example, is a hardware circuit configured by a wired logic. The generating unit 9 may be a functional module realized by a computer program executed in the image processing device 3. The generating unit 9 receives the first image feature from the computation unit 8. The generating unit 9 generates a display image based on the first image feature by controlling image features of an operation area or a part in motion to be set to a second image feature. This process corresponds to step S405 in the flowchart illustrated in FIG. 4. When a gradient is greater than or equal to a predetermined first threshold, the generating unit 9 generates a display image by controlling image features of an operation target object or a part in motion included in an operation area to be set to image features of only contours as the second image feature. When the hue distribution of an operation area is greater than or equal to a predetermined second threshold, the generating unit 9 generates a display image by setting image features with the decreased number of hues to image features of an operation area as the second image feature. When the hue distribution is less than the second threshold, the generating unit 9 generates a display image by setting image features with the hue of an operation area changed to the complement thereof to image features of an operation area as the second image feature. When a pixel value in an operation area is less than a predetermined third threshold, the generating unit 9 generates a display image by setting image features with an increased pixel value to image features of an operation area as the second image feature. A detailed description will be provided later for image processing by the generating unit 9. The generating unit 9 outputs the generated display image to an external device. The external device, for example, may desirably be the projection unit 4 in FIG. 1.

Figure 8:
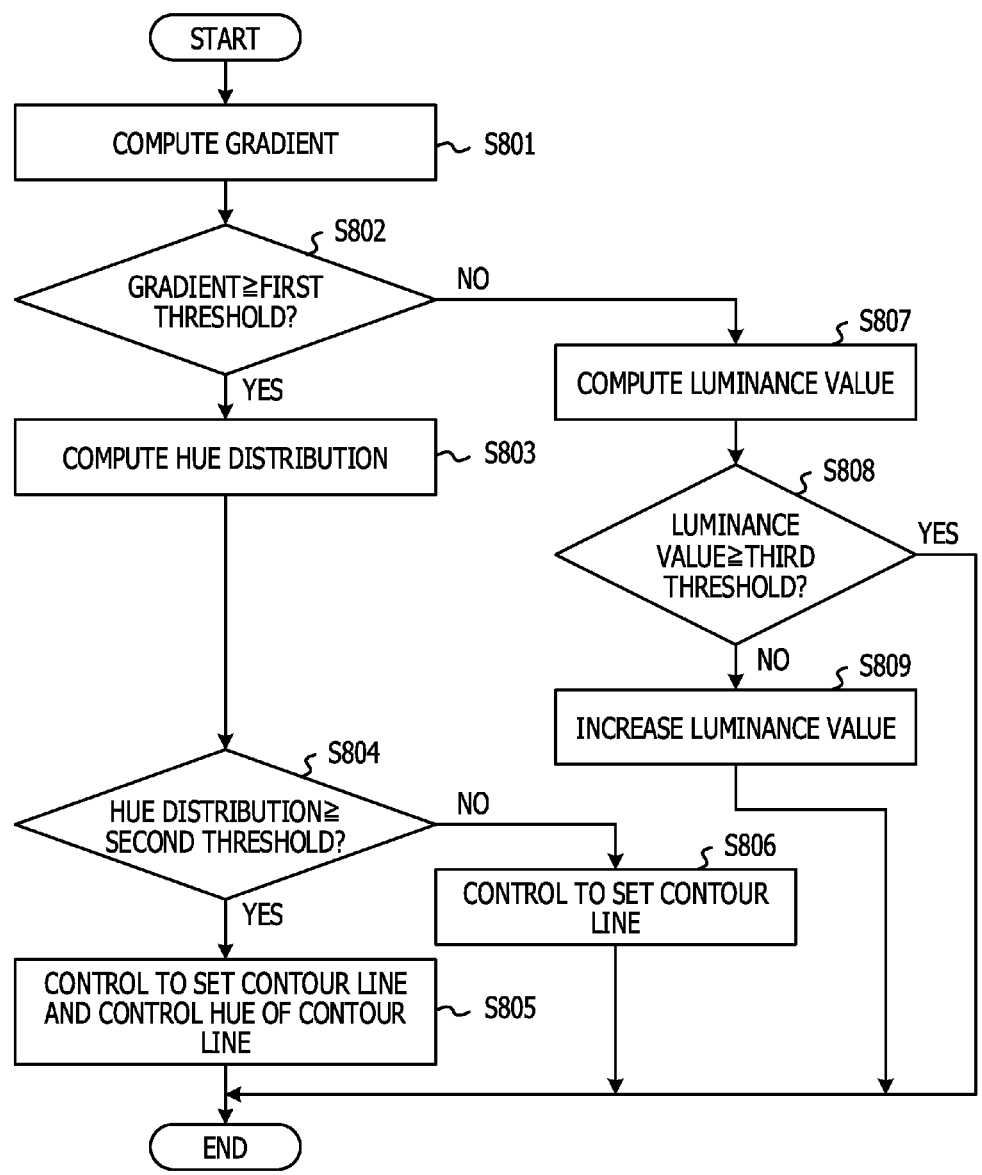
FIG. 8 is a flowchart of image processing by a computation unit and a generating unit.

FIG. 8 is a flowchart of image processing by the computation unit 8 and the generating unit 9. The flowchart illustrated in FIG. 8 corresponds to the detailed flow of S404 or S405 in the flowchart illustrated in FIG. 4. The computation unit 8 computes a gradient (or the number of edges) in an operation area as the first image feature (step S801). In step S801, the computation unit 8 performs edge detection by obtaining a difference between an arbitrary pixel and a pixel in the vicinity thereof in an operation area. Next, the computation unit 8 may binarize an image for which edge detection is performed and may compute the proportion of the number of pixels determined to be an edge in the number of pixels (extent) in an operation area as a gradient.

An operation area having a great gradient has a great amount of visual information. Thus, it is expected that the point of change in a projected display image may be buried under the amount of information of an operation target object, and the display image may be hardly seen. Therefore, when a gradient, which is an example of the first image feature, is greater than or equal to a predetermined first threshold THe (for example, THe=20% to 30%) (Yes in step 802), the computation unit 8 computes a hue distribution which is an example of the first image feature of an operation area (step S803). In step S803, the computation unit 8 may use a method of computing a histogram of an operation area in an RGB color space and obtaining the proportion of distribution of the histogram in the color space as a method for computing a hue distribution. As a method for computing a hue distribution, the computation unit 8, for example, may compute a hue distribution by using a bin that is used when calculating the histogram of the color space. When, for example, the width of a bin is 16, a color level ranging from 0 to 255 may be divided into 16 bins. Since there are three color levels for three color components of R, G, and B, the total number of bins is 4096 which is the cube of 16. The computation unit 8 obtains the number of pixels in an operation area that belong to each of 4096 bins. The computation unit 8 may obtain the number of bins having the number of pixels greater than or equal to a predetermined threshold, for example, the number of pixels greater than or equal to 0.1% of the entire number of pixels in an operation area and use the proportion of the number of bins in 4096 bins as a hue distribution.

When the hue distribution is greater than or equal to a predetermined second threshold Thc (for example, THc=70%) (Yes in step S804), this means that a great number of hues are included in an operation area (particularly in an operation target object). Thus, it is expected that the visibility of an operation area may not be secured when a great number of hues are used in a projected display image. For this reason, the generating unit 9 controls image features of an operation target object and fingers, which are an example of a part in motion, included in an operation area to be set to the second image feature when conditions for Yes in step S802 and step S804 are satisfied. Specifically, the generating unit 9 generates a display image by controlling image features of an operation target object and fingers, which are an example of a part in motion, included in an operation area to be set to only contour lines and reducing the number of hues in a display image so that the display image is easily focused with only the brightness difference caused by the projection (step S805). In step S805, the generating unit 9, for example, may generate a display image with two colors of a Color-H for the hue of the contour of a part in motion and a Color-T for the hue of an operation area. The Color-H, for example, may desirably be a green color having (R, G, B)=(0, 255, 0), and the Color-T, for example, may desirably be a white color having (R, G, B)=(255, 255, 255).

When the hue distribution is less than the second threshold (No in step S804), this means that the number of hues in an operation area is small, and only the gradient is great. Thus, the generating unit 9 generates a display image by controlling image features of an operation target object and fingers, which are an example of a part in motion, included in an operation area to be set to only contour lines as the second image feature when conditions for Yes in step S802 and No in S804 are satisfied (step S806). In step S806, the generating unit 9 may improve the visibility of contour lines by using an arbitrary hue (for example, a complementary color) not included in an operation area. Furthermore, in step S805 or S806, the generating unit 9 may use a method of using an inter-frame differential image obtained by comparing a frame with the previous frame in an operation area as a method for further reducing the amount of information in an operation area. In this case, for example, a differential image including only an area changed by a user coming in contact with an operation target object with fingers may be displayed as a display image.

Here, a description will be provided for the technical meaning of the generating unit 9 controlling image features to be set to contour lines in step S805 or S806. As described above, it is difficult to match the position of an operation target object and the position of a display image completely because the operation target object in the display image is two-dimensional while the actual operation target object onto which the display image is projected is three-dimensional, each of which has a different dimensional quantity. For this reason, the hue of the operation target object of a projection target does not match the hue of the display image as the shape of the operation target object is more complicated (in other words, as the number of edges thereof is greater). Thus, a user has difficulty in determining whether the operation target object originally has a mottled form or is mottled by the projection. Here, by using contour lines, contour lines may be easily recognized because of the continuity of the lines even though the hue of the contour lines is changed due to the hue of the operation target object. This results in the effect of improving the visibility of the operation target area.

In step S806, when the color of a part in motion changes for each frame during the projection of a display image when the operation area, particularly the part in motion included in the operation area is controlled to have an arbitrary hue, the focus of a user is easily drawn to only the hue of the part in motion. Thus, the hue of the part in motion may be the same in all of the frames of the display image. Fingertips are to be the most focused point in the operation area since the operation area is defined based on fingertips as described above. Thus, the generating unit 9 may change the luminance of the contour lines for each pixel so that the luminance value of fingertips becomes the highest in the contours of fingers. Specifically, given that the coordinates of a fingertip in the operation area are (Xf, Yf), the color of the projection light of a fingertip in an RGB color space is (Rf, Gf, Bf), and arbitrary coordinates in the contour of a finger are (x, y), the generating unit 9 may desirably obtain the hue of (x, y) by multiplying (Rf, Gf, Bf) by SQRT ((Xf−x)2+ (Yf−y)2)×D). D is a decrement rate of a luminance value as is further from a fingertip by one pixel. When the hand ID or the finger ID is detected multiple times, the hue of (x, y) may be obtained from the coordinates of a finger at the nearest position. The generating unit 9 may change the hue or the luminance value of a part in motion by distinguishing a case where the coordinates of the depth of a fingertip matches the coordinates of the depth of an operation target object, that is, a case where a fingertip is in contact with an operation target object, and a case where a fingertip is not in contact with an operation target object.

Here, a description will be provided for the technical meaning of the computation unit 8 computing a gradient earlier than a hue distribution in the flowchart in FIG. 8. Generally, there are comparatively a great number of operation target objects having a great gradient (the number of edges) but a small hue distribution. For example, there is an object that is an operation target object configured with two colors and has a complicated pattern. Meanwhile, it is expected that an operation target object having a great hue distribution but a small gradient rarely exists. For this reason, the computation unit 8 computes a gradient (step S801) prior to the computation of a hue distribution (step S803), and this may reduce a process load on the image processing device 3 because the computation process of a hue distribution is not desired in a case of an operation target object having a small gradient.

In step S802, when the gradient is less than the first threshold (No in step S802), this means that the amount of visual information is small in the operation area. However, it is also expected that when the luminance value of an operation target object in an operation area is small, the difference in the luminance value (or the difference in the brightness) between the operation area and the area other than the operation area becomes small, and visibility may be hardly secured even when a display image is projected. For this reason, the computation unit 8 computes the luminance value of the operation area (step S807). For example, the average of the luminance values of all the pixel values in the operation area may be used as the luminance value. When the luminance value is less than a predetermined third threshold THb (for example, THb=100 pixels) (No in step S808), the generating unit 9 increases the luminance value of the operation area (step S809). When the luminance value is greater than or equal to the predetermined third threshold THb (Yes in step S808), the generating unit 9 generates a display image by using the first image feature as the second image feature since the operation area has a sufficiently great luminance value. The computation unit 8 and the generating unit 9 may perform the image processing illustrated in the flowchart in FIG. 8 for all the frames of the actual image obtained by the obtaining unit 5 or may perform the image processing for representative frames determined arbitrarily. When representative frames are determined, the generating unit 9 may desirably control the image features of all the frames to be set to the second image feature, based on the first image feature computed for the representative frames.

Figure 9A:
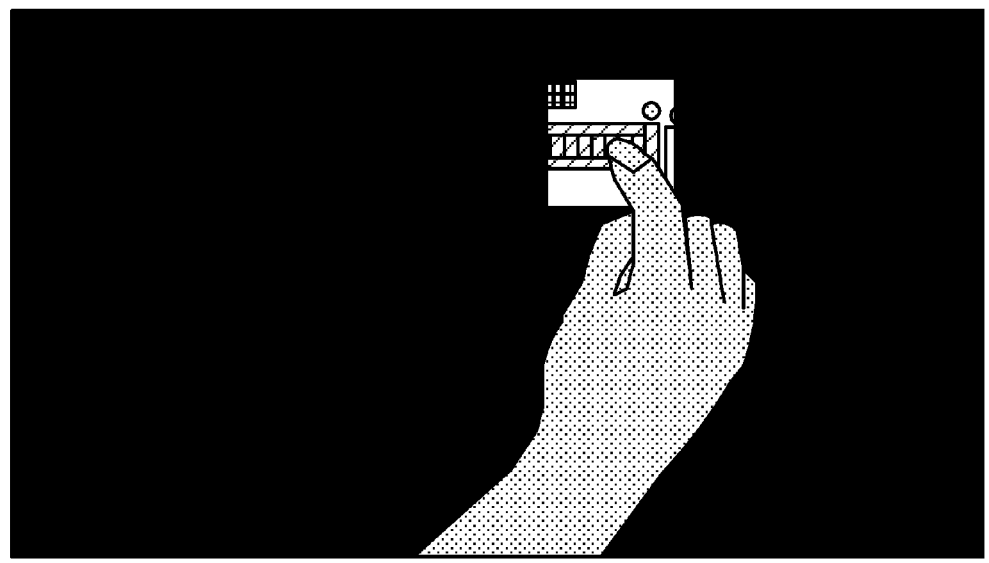
FIG. 9A is a schematic diagram of the display image generated by the generating unit when a first image feature of an operation area is changed to a second image feature.
Figure 9B:
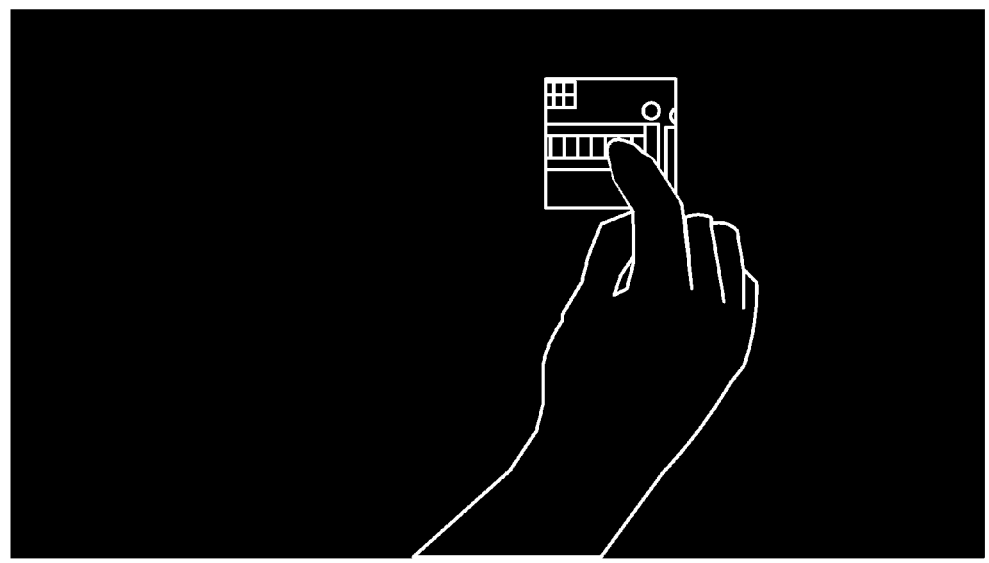
FIG. 9B is a schematic diagram of the display image generated by the generating unit when the object and the part in motion included in the operation area are controlled to be set only with contour lines.

FIG. 9A is a schematic diagram of the display image generated by the generating unit 9 when the first image feature of an operation area is changed to the second image feature. FIG. 9B is a schematic diagram of the display image generated by the generating unit 9 when the object and the part in motion included in the operation area are controlled to be set only with contours. FIG. 9A corresponds to a display image generated by the generating unit 9 when conditions for Yes in step S808 in FIG. 8 are satisfied. FIG. 9B corresponds to a display image generated by the generating unit 9 in step S806 in FIG. 8. In the display image illustrated in FIG. 9A, the hue of the area other than the operation area and the part in motion is black, and the area is not projected. Thus, the extent of projection is decreased. Accordingly, the projected operation area stands out easily, and the visibility thereof is improved. In addition, in the display image illustrated in FIG. 9B, the image features are controlled to be set to contour lines. Thus, even when the gradient or the hue distribution of the actual object onto which the display image is projected is great, the contour lines may be easily recognized because of the continuity of lines. This results in the improved visibility of the operation target area.

According to the image processing device 3 in the first embodiment, there may be provided an image processing device that may generate a display image which may have improved visibility for a user at a low cost.

Second Embodiment

A second embodiment will be described regarding, for example, an embodiment of projecting a display image generated in the first embodiment onto an operation target object. The configuration of an image processing system in the second embodiment is the same as the image processing system 10 illustrated in FIG. 1. Thus, a detailed description thereof will be omitted. It may be considered that a user in the first embodiment and a user in the second embodiment are different.

The first camera 1 and the second camera 2 image an actual image (or an operation target object image) including an actual operation target object onto which a display image is projected. When an operation target object does not move from a table which is an example of the installation surface, the operation target object may be desirably imaged once. In the second embodiment, an operation target object further includes a marker (for example, a two-dimensional code) for specifying a unique operation target object for convenience of description. The obtaining unit 5 obtains an actual image from the first camera 1 or the second camera 2 and outputs the obtained actual image (operation target object image) to the recognition unit 6.

The recognition unit 6 obtains an actual image from the obtaining unit 5. The recognition unit 6 recognizes a display image that the projection unit 4 is to project by using a marker included in an actual image (operation target object image). A display image may be directly selected by a user through a GUI displayed on an unillustrated display connected to an image processing system 12. The recognition unit 6 may also recognize a display image that the projection unit 4 is to project by extracting features from both of an actual image and a display image and comparing the degree of matching between those features.

The projection unit 4 projects a display image specified by the recognition unit 6 onto an operation target object. The installation positions of the projection unit 4 and the first camera 1 or the second camera 2 that images an actual image (operation target object image) in the first embodiment are different. Thus, variations may occur in the superimposed projection of an operation target object and a display image. For this reason, the projection unit 4 may transform a coordinate system between the coordinate system of a display image (or the camera coordinate system) and the coordinate system of a projection image of the projection unit 4 (or a projector coordinate system). In other words, the projection unit 4 may project a display image by matching the extent of a display image and the extent of an operation target object. The projection unit 4, for example, transforms the camera coordinate system and the projector coordinate system by using projective transformation. The projection unit 4 is assumed to hold a coordinate transformation matrix for the camera coordinate system and the projector coordinate system in advance. The projection unit 4, for example, may use a projection method disclosed in "Kato, H., Billinghurst, M. *"Marker tracking and hmd calibration for a video-based augmented reality conferencing system."*, In Proceedings of the 2nd IEEE and ACM International Workshop on Augmented Reality (IWAR 99), October 1999." as a method for projecting a display method with marker recognition. The projection unit 4, for example, may use a transformation method disclosed in Audet, Samuel, and Masatoshi Okutomi, *"A user-friendly method to geometrically calibrate projector-camera systems", Computer Vision and Pattern Recognition Workshops*, 2009. CVPR Workshops 2009. IEEE Computer Society Conference on. IEEE, 2009." as a transformation method of the camera coordinate system and the projector coordinate system.

The position where an operation target object is installed on the installation surface is not necessarily the same in the first embodiment and the second embodiment. For this reason, the projection unit 4 extracts and obtains a plurality of features from both of an actual image and a display image and calculates a coordinate transformation matrix for the camera coordinate system and the projector coordinate system by using the features. The projection unit 4 may project a display image onto the position of an operation target object in a superimposed manner by transforming a display image to the camera coordinate system with the calculated coordinate transformation matrix and using the coordinate transformation matrix for a transformation from camera coordinates to projector coordinates.

The projection unit 4 may further change the projection position of a display image periodically in a time-series manner. Displaying the projection position of a display image in a shaking manner may allow a user to easily focus on an operation area. In this case, the projection unit 4 may desirably move a display image to arbitrary coordinates in an x or a y direction periodically for each frame when performing such a projection. According to the image processing system 12 in the second embodiment, a display image generated in the first embodiment may be projected with increased accuracy in accordance with the position of an actual operation target object onto which the display image is projected. Thus, the visibility of the display image is improved.

Third Embodiment

While a description is provided for the embodiment with the configuration of the image processing system 10 using a plurality of cameras (stereoscopic cameras) in the first embodiment, an embodiment may be performed by using one camera and one distance measuring sensor instead of stereoscopic cameras. This will be described in a third embodiment. FIG. 10 is a schematic diagram of the image processing system 12 including the image processing device 3 according to the second embodiment. The image processing system 12 includes the first camera 1, a distance measuring sensor 11, the image processing device 3, and the projection unit 4. The image processing device 3 is communicably connected to the first camera 1, the distance measuring sensor 11, and the projection unit 4 in a wired or wireless manner. The image processing device 3 includes an unillustrated communication unit and may use resources on a network by transmitting and receiving data to and from various external devices bidirectionally through a communication line. The projection unit 4 may be included in the image processing system 12 when desired but may not be provided in the image processing system 12. The first camera 1, the distance measuring sensor 11, the image processing device 3, and the projection unit 4, for example, may be desirably arranged to face the installation surface but may be arranged to face the wall surface or arranged at an arbitrary position on a mobile terminal or a wearable terminal. The functions of the first camera 1, the image processing device 3, and the projection unit 4 are the same as those in the first embodiment. Thus, detailed descriptions thereof will be omitted.

The distance measuring sensor 11, for example, is a TOF sensor that measures a depth from the round-trip time of laser light or is a pattern irradiation sensor that measures a distortion of a pattern of light when a target is irradiated with a laser beam having a certain pattern. Any of these sensors may be used in the third embodiment. The distance measuring sensor 11, for example, is installed above an operation target object in a vertically downward direction. Intrinsic parameters of the first camera 1 are previously known as those in the first embodiment. The optical axes of the distance measuring sensor 11 and the first camera 1 are parallel to each other and are arranged so that horizontal axes in images are arranged on the same straight line.

In the third embodiment, a hand contour area and a depth may be computed by using the distance measuring sensor 11. The recognition unit 6 may use data that is called a distance image and is obtained from the distance measuring sensor 11. A distance image is an image having the value of the distance from the distance measuring sensor 11 to a target object instead of typically having the value of color or tone of a two-dimensional image. A learning process is desired prior to the start of image processing in the third embodiment. The learning process, for example, stores multiple templates related to a distance image of a hand on an unillustrated cache or a memory of the recognition unit 6 or on an unillustrated database. Next, a user manually cuts a hand area out of each distance image and specifies fingertip coordinates. A hand contour area is normalized to have a certain size and is held in the recognition unit 6. In the third embodiment, the image processing device 3 repeats the above learning process until a certain template is obtained.

The recognition unit 6 obtains a distance image at current time from the distance measuring sensor 11 after the start of image processing in the third embodiment. Thereafter, the distance image is scanned with a window having an arbitrary magnification. In each window, template matching may be performed that calculates the similarity between the distance image in the window and all the templates and selects a template having the highest similarity. A sum of squared difference (SSD), a normalized cross-correlation (NCC), or the like may be used as an example of the computation of the similarity. After selecting the optimum template through template matching, the recognition unit 6 obtains the position information of fingers held in the optimum template and obtains a value of the depth corresponding to the position of fingers from the current distance image. The structure of data obtained in this process, for example, is the same as the table 60 illustrated in FIG. 6. Other processes are the same as those in the first embodiment. Thus, detailed descriptions thereof will be omitted.

According to the image processing device 3 in the third embodiment, there may be provided an image processing device that may generate a display image which may have improved visibility for a user at a low cost as that in the first embodiment.

Fourth Embodiment

Figure 11:
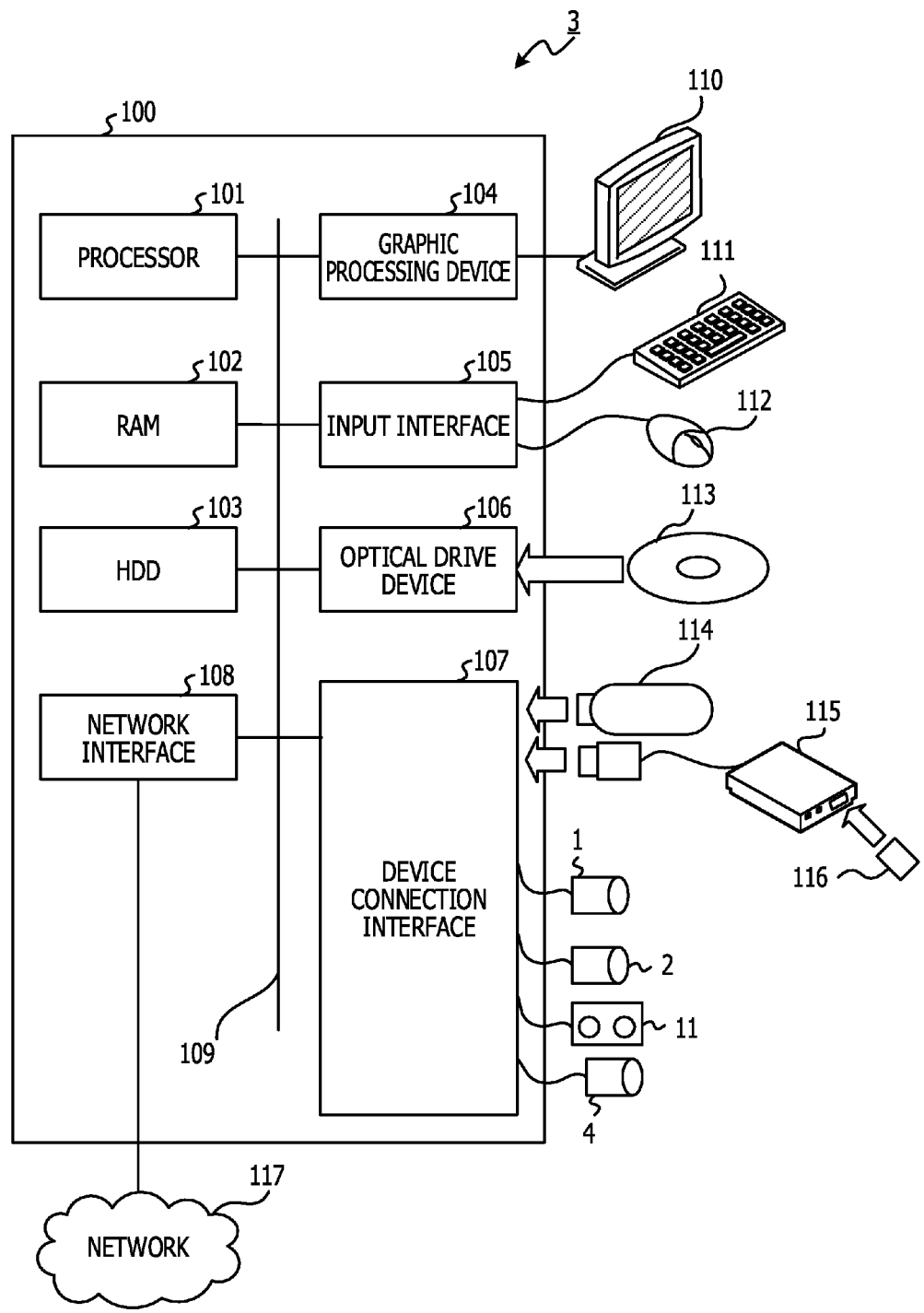
FIG. 11 is a diagram of the hardware configuration of a computer functioning as the image processing device according to an embodiment.

FIG. 11 is a diagram of the hardware configuration of a computer functioning as the image processing device 3 according to an embodiment. The image processing device 3 is configured to include a computer 100 and an input-output device (peripheral) connected to the computer 100 as illustrated in FIG. 11.

The entire device of the computer 100 is controlled by a processor 101. A random access memory (RAM) 102 and a plurality of peripherals are connected to the processor 101 through a bus 109. The processor 101 may be a multiprocessor. The processor 101, for example, is a CPU, a microprocessing unit (MPU), a digital signal processor (DSP), an application-specific integrated circuit (ASIC), or a programmable logic device (PLD). The processor 101 may be a combination of two or more elements among a CPU, an MPU, a DSP, an ASIC, and a PLD. The processor 101, for example, may perform the processes of functional blocks such as the obtaining unit 5, the recognition unit 6, the defining unit 7, the computation unit 8, and the generating unit 9 in FIG. 3.

The RAM 102 is used as a main storage device of the computer 100. The RAM 102 temporarily stores at least a part of operating system (OS) programs and application programs executed by the processor 101. The RAM 102 also stores various pieces of data that are desired in the processes by the processor 101.

Peripherals connected to the bus 109 include a hard disk drive (HDD) 103, a graphic processing device 104, an input interface 105, an optical drive device 106, a device connection interface 107, and a network interface 108.

The HDD 103 magnetically writes and reads data on an incorporated disk. The HDD 103, for example, is used as an auxiliary storage device of the computer 100. The HDD 103 stores OS programs, application programs, and various pieces of data. A semiconductor storage device such as a flash memory may also be used as an auxiliary storage device.

A monitor 110 is connected to the graphic processing device 104. The graphic processing device 104 displays various images on the screen of the monitor 110 in accordance with the instructions from the processor 101. Examples of the monitor 110 include a display device using a cathode ray tube (CRT), a liquid crystal display device, and the like.

A keyboard 111 and a mouse 112 are connected to the input interface 105. The input interface 105 transmits signals transmitted from the keyboard 111 and the mouse 112 to the processor 101. The mouse 112 is an example of a pointing device. Other pointing devices may also be used instead. Other pointing devices include a touch panel, a tablet, a touchpad, a trackball, and the like.

The optical drive device 106 uses laser light to read data recorded on an optical disc 113. The optical disc 113 is a portable recording medium on which data is recorded and is readable by reflection of light. Examples of the optical disc 113 include a digital versatile disc (DVD), a DVD-RAM, a compact disc read-only memory (CD-ROM), a CD-Recordable (CD-R)/Rewritable (CD-RW), and the like. A program stored in the optical disc 113, which is a portable recording medium, is installed on the image processing device 3 through the optical drive device 106. A predetermined installed program is executable by the image processing device 3.

The device connection interface 107 is a communication interface for connecting peripherals to the computer 100. For example, a memory device 114 and a memory reader and writer 115 may be connected to the device connection interface 107. The memory device 114 is a recording medium having a function of communicating with the device connection interface 107. The memory reader and writer 115 is a device that writes data into a memory card 116 or reads data from the memory card 116. The memory card 116 is a card-type recording medium. The first camera 1 and the second camera 2, for example, are imaging devices such as a charge-coupled device (CCD) camera and a complementary metal oxide semiconductor (CMOS) camera. The functions of the first camera 1 and the second camera 2 are the same as those in the first embodiment to the third embodiment described above. Thus, detailed descriptions thereof will be omitted. The distance measuring sensor 11, for example, is a TOF sensor that measures a depth from the round-trip time of laser light or is a pattern irradiation sensor that measures a distortion of a pattern of light when a target is irradiated with a laser beam having a certain pattern. The function of the distance measuring sensor 11 is the same as that in the third embodiment described above. Thus, a detailed description thereof will be omitted. The projection unit 4 is a display device such as a projector. The projection unit 4, for example, displays a display image including additional information on an operation target object (for example, the content of operation performed by a skilled user). The projection unit 4, for example, projects a display image in a superimposed manner onto an operation target object, which is an example of a projection surface, of a user. The function of the projection unit 4 is the same as that in the first embodiment to the third embodiment described above. Thus, a detailed description thereof will be omitted.

The network interface 108 is connected to a network 117. The network interface 108 transmits and receives data to and from other computers or communication devices through the network 117.

The computer 100, for example, realizes the image processing function described above by executing a program recorded on a computer-readable recording medium. A program in which the content of processes executed by the computer 100 is written may be recorded on various recording media. The program may be configured by one or more functional modules. For example, the program may be configured by functional modules executing the processes of the obtaining unit 5, the recognition unit 6, the defining unit 7, the computation unit 8, and the generating unit 9 disclosed in FIG. 3. The program executed by the computer 100 may be stored on the HDD 103. The processor 101 loads at least a part of the programs in the HDD 103 into the RAM 102 and executes the loaded program. The program executed by the computer 100 may be recorded on a portable recording medium such as the optical disc 113, the memory device 114, and the memory card 116. The program stored on a portable recording medium, for example, is installed on the HDD 103 by the control of the processor 101 and then becomes executable. The processor 101 may also read the program directly from a portable recording medium and execute the program.

Each illustrated constituent of each device is not necessarily configured physically as illustrated in the drawings. That is to say, specific forms of distribution or integration of each device are not limited to the illustrations. The entire or a part of the devices may be configured functionally or physically in a distributed or an integrated manner in arbitrary units, depending on various loads, a status of use, and the like. Various processes described in the embodiments above may be realized by a computer such as a personal computer and a workstation executing a program prepared in advance. While descriptions are provided for a case where fingers have flesh color, and the background also has flesh color similarly in the embodiments, the embodiments are not limited to this case. The embodiments may be apparently applied to a case where, for example, fingers are covered by a glove and the like, and a background having color similar to the color of the glove is used.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing device comprising:
a processor; and
a memory which stores a plurality of instructions, which when executed by the processor, cause the processor to execute:
obtaining an actual image including a motion part and a target object of an operation;
recognizing the motion part from the actual image;
defining an operation area of the actual image based on a position of the motion part;
computing a first image feature of the operation area, the first image feature being a gradient of a pixel value of the operation area, a hue distribution of the operation area, and/or the pixel value of the operation area;
generating a display image by setting, based on the first image feature, the operation area and/or the motion part to be a second image feature which differs from the first image feature; and
setting a decreased number of hues of the operation area as the second image feature when the hue distribution is greater than or equal to a predetermined second threshold.

2. The device according to claim 1,
wherein the motion part is fingertips of a user, and
wherein the operation area is defined as a region with a certain area around the fingertips.

3. The device according to claim 1,
further comprising setting contour lines of the target object and/or the motion part included in the operation area as the second image feature when the gradient is greater than or equal to a predetermined first threshold.

4. The device according to claim 1,
further comprising changing the hue of the operation area to the complement of the hue as the second image feature when the hue distribution is less than the second threshold.

5. The device according to claim 1,
further comprising setting an increased pixel value as the second image feature when the pixel value is less than a predetermined third threshold.

6. The device according to claim 1, further comprising:
obtaining a plurality of actual images captured from different optical axes,
recognizing three-dimensional orthogonal coordinates of the motion part from the plurality of actual images, and
defining the operation area, based on the three-dimensional orthogonal coordinates.

7. The device according to claim 1, further comprising:
measuring distances from three-dimensional orthogonal coordinates of the motion part; and
defining the operation area based on the three-dimensional orthogonal coordinates.

8. The device according to claim 1, further comprising:
projecting the display image;
obtaining a marker image of the target object image;
recognizing, based on the marker, the display image corresponding to the operation target object image; and
projecting the display image onto the operation target object in a superimposed manner.

9. The device according to claim 8,
further comprising projecting the display image by matching the extents of the display image and the operation target object.

10. The device according to claim 8,
further comprising changing the projection position of the display image periodically.

11. An image processing method comprising:
obtaining an actual image including a motion part and a target object of an operation;
recognizing the motion part from the actual image;
defining an operation area of the actual image based on a position of the motion part;
computing, by a computer processor, a first image feature of the operation area, the first image feature being a gradient of a pixel value of the operation area, a hue distribution of the operation area, and/or the pixel value of the operation area;
generating a display image by setting, based on the first image feature, the operation area and/or the part to be a second image feature which differs from the first image feature;
setting a decreased number of hues of the operation area as the second image feature when the hue distribution is greater than or equal to a predetermined second threshold.

12. The method according to claim 11,
wherein the motion part is fingertips of a user, and
wherein the operation area is defined as a region with a certain area around the fingertips.

13. The method according to claim 11,
further comprising setting contour lines of the target object and/or the motion part included in the operation area as the second image feature when the gradient is greater than or equal to a predetermined first threshold.

14. The method according to claim 11,
further comprising changing the hue of the operation area to the complement of the hue as the second image feature when the hue distribution is less than the second threshold.

15. The method according to claim 11,
further comprising setting an increased pixel value as the second image feature when the pixel value is less than a predetermined third threshold.

16. The method according to claim 11, further comprising:
   obtaining a plurality of actual images captured from different optical axes,
   recognizing three-dimensional orthogonal coordinates of the motion part from the plurality of actual images, and
   defining the operation area, based on the three-dimensional orthogonal coordinates.

17. The method according to claim 11, further comprising:
   measuring distances from three-dimensional orthogonal coordinates of the motion part; and
   defining the operation area based on the three-dimensional orthogonal coordinates.

18. The method according to claim 11, further comprising:
   projecting the display image;
   obtaining a marker image of the target object including a marker;
   recognizing, based on the marker, the display image corresponding to the operation target object image; and
   projecting the display image onto the operation target object in a superimposed manner.

19. The method according to claim 18,
   further comprising projecting the display image by matching the extents of the display image and the operation target object.

20. The method according to claim 18,
   further comprising changing the projection position of the display image periodically.

21. A computer-readable non-transitory medium storing an image processing program that causes a computer to execute a process comprising:
   obtaining an actual image including a motion part and a target object of an operation;
   recognizing the motion part from the actual image;
   defining an operation area of the actual image based on a position of the motion part;
   computing, by a computer processor, a first image feature of the operation area, the first image feature being a gradient of a pixel value of the operation area, a hue distribution of the operation area, and/or the pixel value of the operation area;
   generating a display image by setting, based on the first image feature, the operation area and/or the motion part to be a second image feature which differs from the first image feature; and
   setting a decreased number of hues of the operation area as the second image feature when the hue distribution is greater than or equal to a predetermined second threshold.

* * * * *